United States Patent
Amagasa et al.

(10) Patent No.: US 9,180,838 B2
(45) Date of Patent: Nov. 10, 2015

(54) MOTOR CONTROL DEVICE

(75) Inventors: Toshiyuki Amagasa, Kiryu (JP); Hiroto Tanaka, Kiryu (JP); Tamotsu Iwazaki, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days.

(21) Appl. No.: 14/234,354

(22) PCT Filed: Jun. 26, 2012

(86) PCT No.: PCT/JP2012/066288
§ 371 (c)(1),
(2), (4) Date: Jan. 22, 2014

(87) PCT Pub. No.: WO2013/015061
PCT Pub. Date: Jan. 31, 2013

(65) Prior Publication Data
US 2014/0139148 A1 May 22, 2014

(30) Foreign Application Priority Data
Jul. 26, 2011 (JP) .................. 2011-163082

(51) Int. Cl.
*H02P 7/00* (2006.01)
*B60S 1/08* (2006.01)

(52) U.S. Cl.
CPC *B60S 1/08* (2013.01); *H02P 7/0038* (2013.01)

(58) Field of Classification Search
CPC ........... H02P 6/142; H02P 6/085; H02P 6/16; H02P 8/38; H02P 1/52; H02P 21/04; H02P 2203/05; H02P 23/0063; H02P 23/10; H02P 25/02; H02P 25/023; H02P 25/025; H02P 27/05; H02P 6/00; H02P 6/06
USPC ......... 318/139, 400.14, 400.07, 14, 432, 266, 318/466, 721, 727; 15/250.14; 180/446
See application file for complete search history.

(56) References Cited

U.S. PATENT DOCUMENTS 5,619,886 A * 4/1997 Hoshino ......................... 74/522
5,969,496 A * 10/1999 Yamada et al. ................ 318/715
(Continued)

FOREIGN PATENT DOCUMENTS

CN 101542892 A 9/2009
JP 2005-255055 9/2005
(Continued)

OTHER PUBLICATIONS

International Search Report for PCT/JP2012/066288 dated Sep. 11, 2012.
(Continued)

*Primary Examiner* — Paul Ip
(74) *Attorney, Agent, or Firm* — Kenyon & Kenyon LLP (57) ABSTRACT

A motor control device is provided which controls a motor by performing switching between forward rotation and reverse rotation so as to cause an object to be controlled to reciprocate, the motor control device including a lead angle map storage unit configured to store a lead angle map in which a motor rotation speed and a lead angle to be set are associated for each of the forward rotation and the reverse rotation, a target rotation speed-setting unit configured to set a target rotation speed of the motor based on an input signal from outside, a lead angle-setting unit configured to obtain the lead angle associated with the set target rotation speed by referring to the lead angle map and set the lead angle as a lead angle of the motor, and a driving control unit configured to control rotation of the motor so as to achieve the set target rotation speed and the set lead angle.

2 Claims, 5 Drawing Sheets

(56) References Cited

U.S. PATENT DOCUMENTS

| | | | |
|---|---|---|---|
| 6,002,234 A * | 12/1999 | Ohm et al. | 318/729 |
| 6,037,741 A * | 3/2000 | Yamada et al. | 318/721 |
| 6,545,442 B2 * | 4/2003 | Sunaga et al. | 318/727 |
| 6,609,266 B1 * | 8/2003 | Satoh et al. | 15/250.13 |
| 6,979,971 B2 * | 12/2005 | Takamune et al. | 318/632 |
| 7,116,073 B1 * | 10/2006 | Sorkin | 318/530 |
| 7,135,829 B1 * | 11/2006 | Sorkin | 318/400.07 |
| 7,821,217 B2 * | 10/2010 | Abolhassani et al. | 318/432 |
| 8,169,171 B2 * | 5/2012 | Kiyamura | 318/400.14 |
| 8,933,653 B2 * | 1/2015 | Ichikawa et al. | 318/139 |
| 2002/0030463 A1 * | 3/2002 | Sunaga et al. | 318/727 |
| 2002/0170135 A1 * | 11/2002 | Zimmer | 15/250.21 |
| 2003/0184252 A1 * | 10/2003 | Takamune et al. | 318/632 |
| 2007/0040529 A1 * | 2/2007 | Takebayashi et al. | 318/685 |
| 2007/0158132 A1 * | 7/2007 | Ta et al. | 180/446 |
| 2007/0267990 A1 * | 11/2007 | Abolhassani et al. | 318/432 |
| 2008/0201041 A1 * | 8/2008 | Jiang | 701/42 |
| 2009/0119864 A1 * | 5/2009 | Mayer | 15/250.14 |
| 2010/0097021 A1 * | 4/2010 | Kiyamura | 318/400.14 |

FOREIGN PATENT DOCUMENTS

| | | |
|---|---|---|
| JP | 2009248650 A | 10/2009 |
| JP | 2010-228527 | 10/2010 |
| JP | 2011-114995 | 6/2011 |
| WO | 2006117082 A1 | 11/2006 |

OTHER PUBLICATIONS

Office Action issued in corresponding Chinese Application No. 201280036392.6, dated May 28, 2015.

Supplementary European Search Report issued in corresponding European Patent Application No. 12818334.0, issued on Sep. 4, 2015.

* cited by examiner

| INPUT SIGNAL | CONTROL PARAMETER | |
|---|---|---|
| WIPER SWITCH SIGNAL - Lo | MAXIMUM ROTATION SPEED | 65 |
| | OPERATION START POSITION | 0 |
| | OPERATION END POSITION | 150 |
| ⋮ | ⋮ | |
| ⋮ | ⋮ | |
| ⋮ | ⋮ | |

MOTOR CONTROL DEVICE

TECHNICAL FIELD

The present invention relates to a motor control device which controls rotation of a motor that operates a wiper device and the like provided in a vehicle.

Priority is claimed on Japanese Patent Application No. 2011-163082, filed Jul. 26, 2011, the content of which is incorporated herein by reference.

BACKGROUND ART

Vehicles are conventionally provided with a wiper device attached to the windshield to wipe off rain, splashes from a preceding vehicle, etc. in order to provide the driver with an optimum field of vision. The wiper device has a wiper arm whose oscillation is controlled by a wiper-driving device and a wiper blade abutting the windshield is mounted on a tip end of the wiper arm. The wiper arm on which the wiper blade is mounted performs a reciprocating motion, so that wiping of the windshield is performed. A link mechanism changes a rotational motion of a motor to a reciprocating motion and thus the wiper arm performs a wiping operation.

Because the wiper arm is required to perform a reciprocating motion, a more efficient and highly-functional wiper device is obtained in case that the motor generating a driving force for the reciprocating motion performs switching between the forward rotation and the reverse rotation, which makes the link mechanism for causing the reciprocating motion unnecessary, rather than in case that the reciprocating motion is implemented through the link mechanism by rotating the motor in only one direction. Therefore, the number of wiper devices which cause the wiper arm to reciprocate by switching the rotation of the motor between the forward rotation and the reverse rotation has recently increased (for example, see Patent Literature 1).

CITATION LIST

Patent Literature

[Patent Literature 1]
Japanese Unexamined Patent Application, First Publication No. 2010-228527

SUMMARY OF INVENTION

Technical Problem

Incidentally, when a brush motor is used, it is possible to rotate the motor in a state in which characteristics are good by optimally setting a lead angle. However, there is a problem in that characteristics are degraded during the reverse rotation if the lead angle is optimally set for the forward rotation in case that the motor rotates with switching between the forward rotation and the reverse rotation so as to cause the wiper arm to reciprocate. In order to avoid this problem, it is necessary to use a position of a brush in a state in which there is no lead angle so that there is no difference in motor characteristics between forward rotation and reverse rotation in the wiper device using the motor which performs the forward and reverse rotation.

However, in the state in which there is no lead angle, there is a problem such as poor efficiency in a high rotation zone, a large amount of electric current needs to flow, and an increase of heat generation.

The present invention has been made in view of such circumstances, and an object of the invention is to provide a motor control device capable of suppressing electric power consumption and heat generation by constantly rotating a motor in a state in which efficiency is good.

Solution to Problem

According to the present invention, a motor control device is provided which controls a motor by performing switching between forward rotation and reverse rotation so as to cause an object to be controlled to reciprocate, the motor control device including a lead angle map storage unit configured to store a lead angle map in which a motor rotation speed and a lead angle to be set are associated for each of the forward rotation and the reverse rotation, a target rotation speed-setting unit configured to set a target rotation speed of the motor based on an input signal from outside, a lead angle-setting unit configured to obtain the lead angle associated with the set target rotation speed by referring to the lead angle map and set the lead angle as a lead angle of the motor, and a driving control unit configured to control rotation of the motor so as to achieve the set target rotation speed and the set lead angle.

According to the present invention, the object to be controlled is a wiper device provided in a vehicle.

Advantageous Effects of Invention

According to the present invention, there is an effect in that it is possible to constantly rotate a motor in a state in which characteristics of the motor are good and suppress electric power consumption and heat generation because a lead angle map in which a motor rotation speed (the number of rotations) and a lead angle to be set are associated is stored for each of forward rotation and reverse rotation and the lead angle corresponding to a newly obtained target rotation speed is also varied according to variation in the target rotation speed.

DESCRIPTION OF EMBODIMENTS

Figure 1:
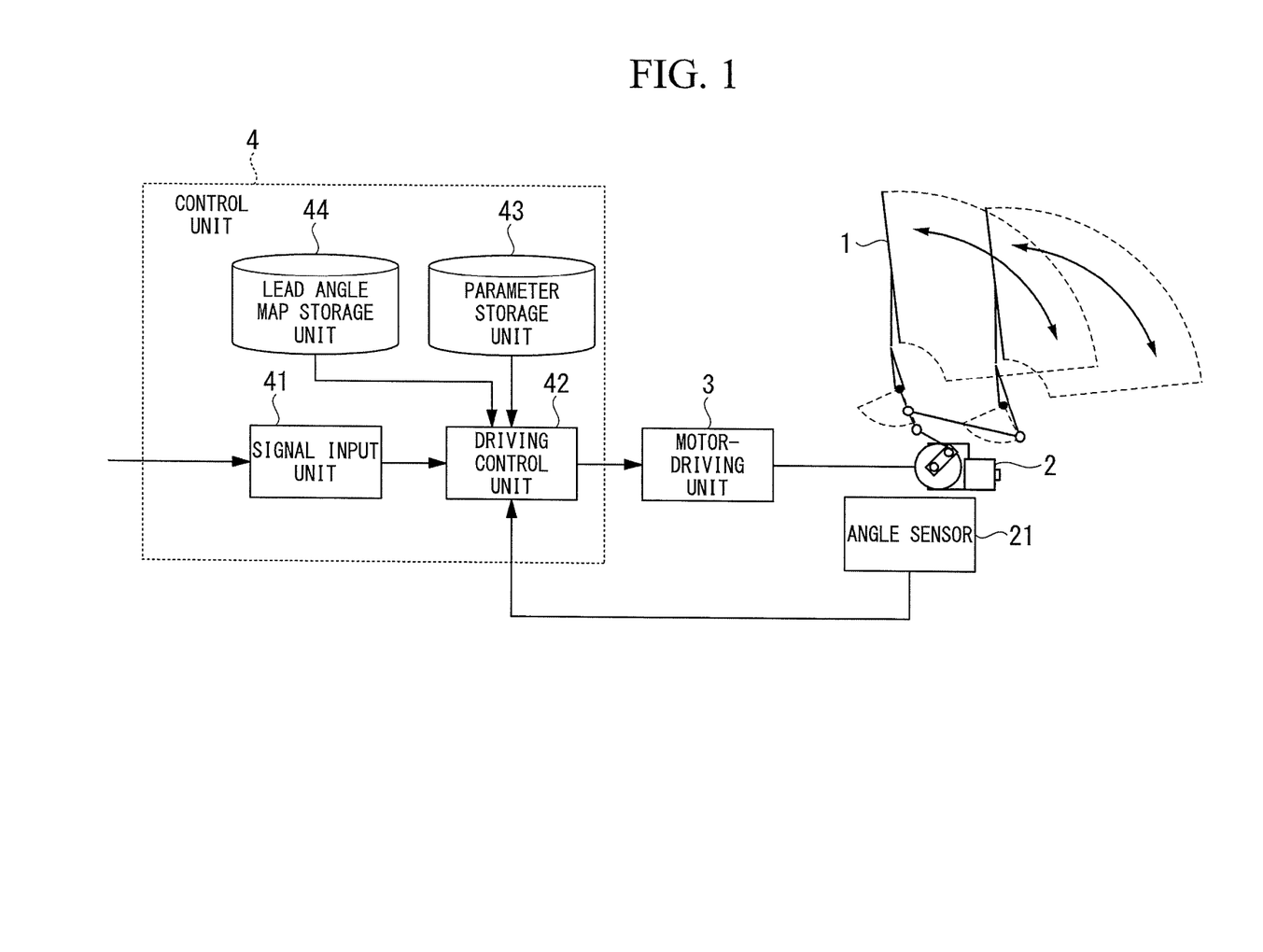
FIG. 1 is a block diagram illustrating a configuration of an embodiment of the present invention.

Hereinafter, a motor control device according to an embodiment of the present invention will be described with reference to the drawings. FIG. 1 is a block diagram illustrating a configuration of the embodiment. Here, an example of a wiper device provided on a vehicle will be described as an object to be controlled according to rotation of a motor to be controlled by the motor control device. In FIG. 1, reference sign 1 denotes a wiper arm which wipes a windshield. Reference sign 2 denotes a brushless motor for causing the wiper arm 1 to perform a wiping operation, and which is possible to change a lead angle by varying a flowing electric current pattern. The wiper arm 1 is connected to a rotary shaft of the motor 2 through a link mechanism, and performs the wiping operation by switching a rotational direction of the rotary shaft between forward rotation and reverse rotation and reciprocating the wiper arm 1. Reference sign 21 denotes an angle sensor which detects and outputs the rotational angle of the rotary shaft of the motor. Here, for simplicity of description, the rotational angle of the rotary shaft of the motor 2 and an operation angle of the wiper arm 1 will be described as being consistent. That is, the rotary shaft of the motor 2 is assumed to reciprocate at the rotational angle between 0 degrees and 150 degrees by performing forward and reverse rotations if the operation angle of the wiper arm 1 is 0 degrees to 150 degrees. Reference sign 3 denotes a motor-driving unit which drives the motor 2 by controlling electric power to be supplied according to a driving command.

Reference sign 4 denotes a control unit which outputs the driving command to the motor-driving unit 3 in order to control the rotation of the motor 2, and includes a microcomputer. Reference sign 41 denotes a signal input unit which inputs a signal which is transmitted and received within a vehicle via an in-vehicle local area network (LAN), for example, a controller area network (CAN) or a local interconnect network (LIN). The signal input by the signal input unit 41 includes a signal representing a state of a wiper switch which issues an instruction to start/stop a wiping operation to the wiper device or a signal representing a speed (a low speed, a high speed, intermittence, or the like) of the wiping operation.

Reference sign 42 denotes a driving control unit which controls the wiping operation of the wiper arm 1 by controlling the operation of the motor 2 based on a signal input in the signal input unit 41. Reference sign 43 denotes a parameter storage unit which associates and stores a pattern of the input signal input in the signal input unit 41 and parameters for controlling the motor 2 in advance. Reference sign 44 denotes a lead angle storage unit which stores lead angle map data defining a relationship between the number of rotations of the motor and the lead angle.

Next, a table structure of the parameter storage unit 43 illustrated in FIG. 1 will be described with reference to FIG. 2.

Figure 2:
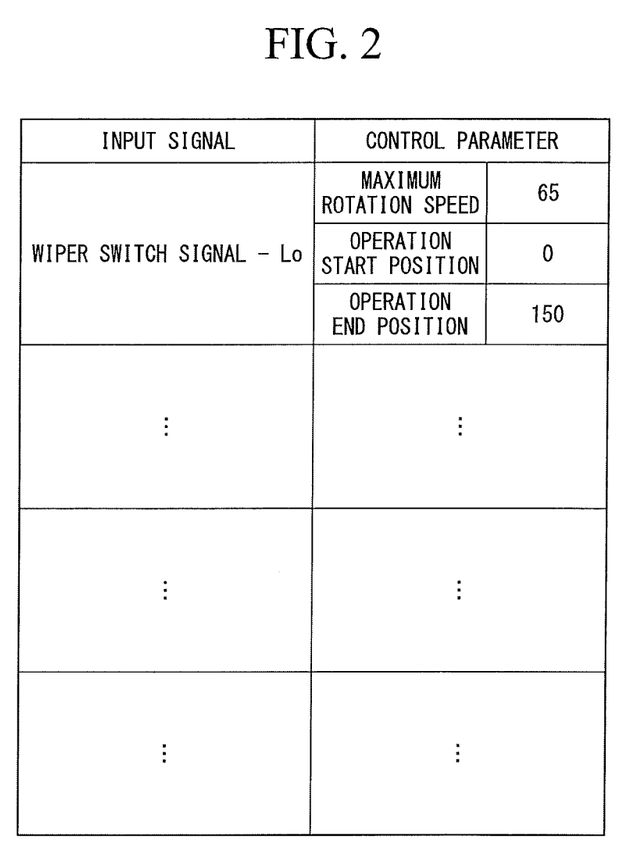
FIG. 2 is an explanatory diagram illustrating a table structure of a parameter storage unit 43 illustrated in FIG. 1.

FIG. 2 is a diagram illustrating the table structure of the parameter storage unit 43 illustrated in FIG. 1. In the parameter storage unit 43, control parameters are associated and stored for each input signal pattern.

The input signal pattern is made by performing case analysis on input signals. When the signal to be input is a wiper switch signal, the case analysis is made for each signal value (for example, Lo, Hi, or intermittence). In this case analysis, all of the cases are associated and stored in advance when it is necessary to control an operation of the wiper device according to a signal input to the signal input unit 41.

There are three control parameters, namely, a "maximum rotation speed," an "operation start position," and an "operation end position." The "maximum rotation speed" is a maximum value of the rotation speed of the motor 2 when the wiper arm 1 operates from a current position or a predetermined position to a target position. Here, the rotation speed is represented by the number of rotations [rpm]. The "operation start position" is a position of the wiper arm 1 when a predetermined operation is started. Here, it is assumed that the position of the wiper arm 1 is represented by an angle, a storage position of the wiper arm 1 is 0 degrees, and a return position of the wiper arm 1 is 150 degrees in a maximum wiping range. The "operation end position" is a position of the wiper arm 1 when a predetermined operation ends. For example, when the wiper arm is caused to perform a wiping operation in a maximum wiping range, the "operation start position" is 0 degrees and the "operation end position" is 150 degrees.

Figure 3:
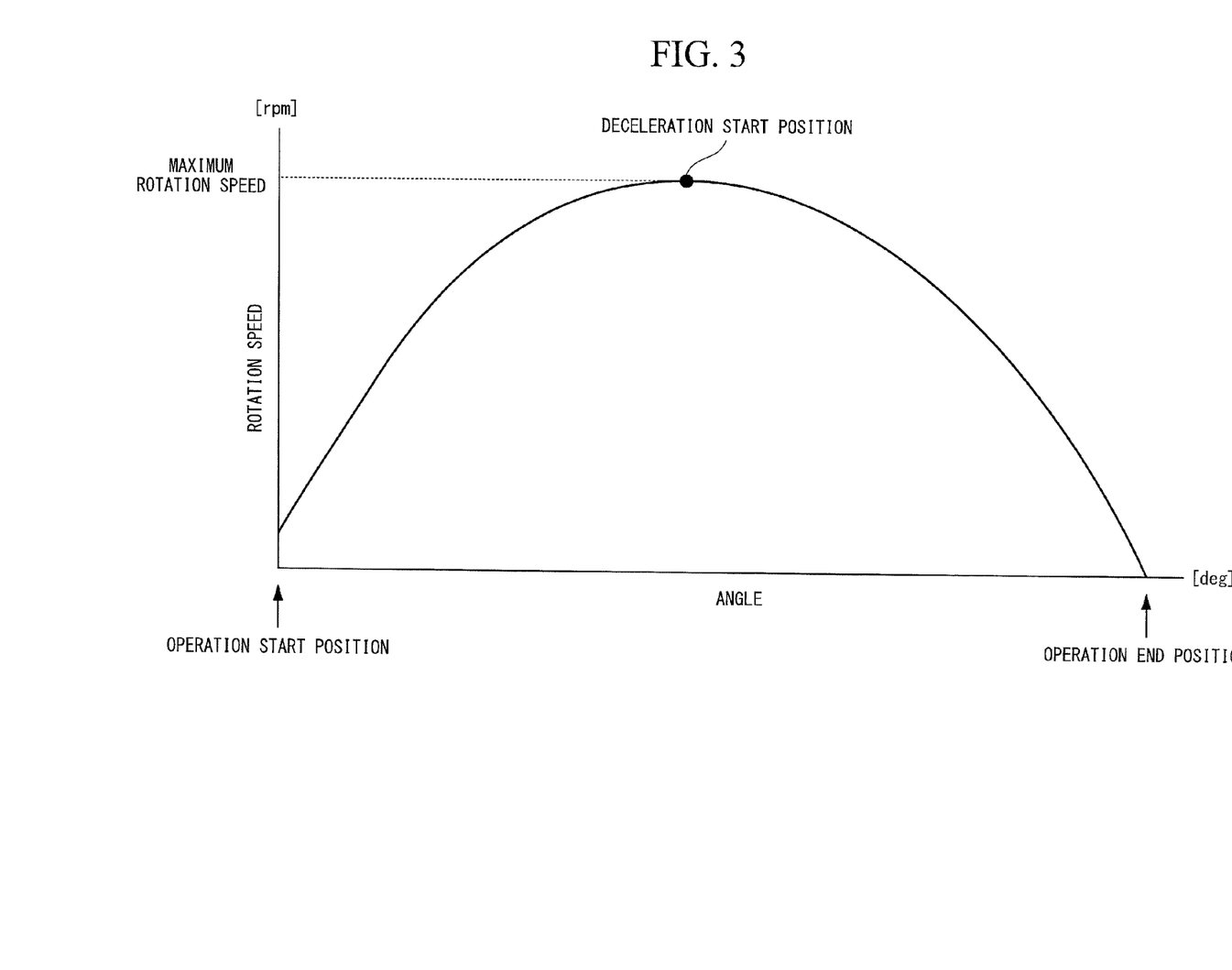
FIG. 3 is an explanatory diagram illustrating an operation of a motor 2 illustrated in FIG. 1.

Next, the operation of the motor 2 will be described with reference to FIG. 3. FIG. 3 is a diagram illustrating variation in the rotation speed of the motor 2 when the wiper arm 1 is operated from the operation start position to the operation end position. When the three control parameters (the maximum rotation speed, the operation start position, and the operation end position) are specified according to an input signal pattern, the driving control unit 42 first obtains a deceleration start position through an arithmetic operation from the operation start position and the operation end position. Then, the rotation speed is accelerated so that the rotation speed of the motor 2 is set to the maximum rotation speed at the angle of the deceleration start position.

Subsequently, when the deceleration start position has been reached (a point in time at which the maximum rotation speed has been reached), the rotation speed is decelerated so that the rotation speed is changed to deceleration and the rotation speed at the angle of the operation end position becomes 0. At this time, it is possible to implement the operation of the wiper arm 1 without a sense of incompatibility by smoothly varying the rotation speed as in a curve illustrated in FIG. 3. The operation of the wiper arm 1 replaces the operation start position and the operation end position of the operation illustrated in FIG. 3 and thus the wiper arm 1 can reciprocate to perform the wiping operation.

Figure 4:
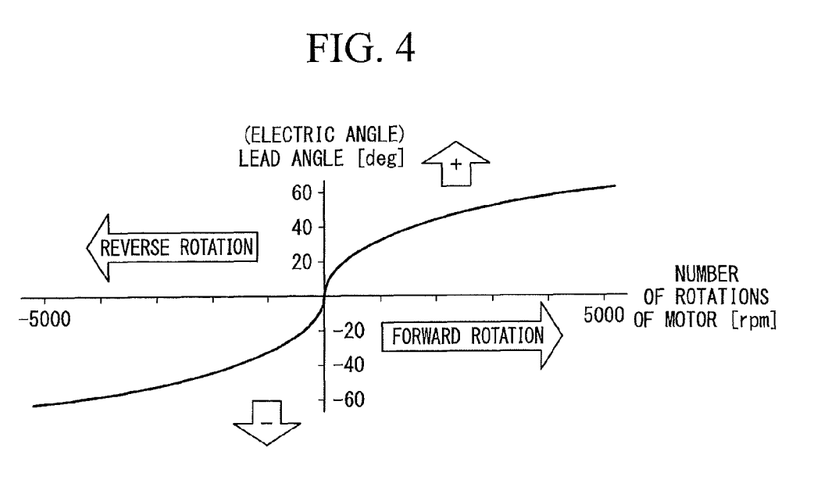
FIG. 4 is an explanatory diagram illustrating a configuration of a lead angle map in which a relationship between the number of rotations of the motor and a lead angle is stored in a lead angle map storage unit 44 illustrated in FIG. 1.

Next, a configuration of the lead angle map which defines the number of rotations of the motor and the lead angle stored in the lead angle map storage unit 44 illustrated in FIG. 1 will be described with reference to FIG. 4. FIG. 4 is an explanatory diagram illustrating the configuration of the lead angle map which defines the number of rotations of the motor and the lead angle stored in the lead angle map storage unit 44 illustrated in FIG. 1. In the lead angle map, a relationship between the number of rotations of the motor (rpm) and a lead angle (deg) is defined in advance, and a positive lead angle is defined to increase when the number of rotations during forward rotation increases. In addition, when the number of rotations during reverse rotation increases (when an absolute number of the negative number of rotations increases), a negative lead angle is defined to increase (an absolute value of a negative lead angle is defined to increase). When the number of rotations of the motor (the positive or negative number of rotations) is defined, it is possible to specify the lead angle to be set.

Figure 5:
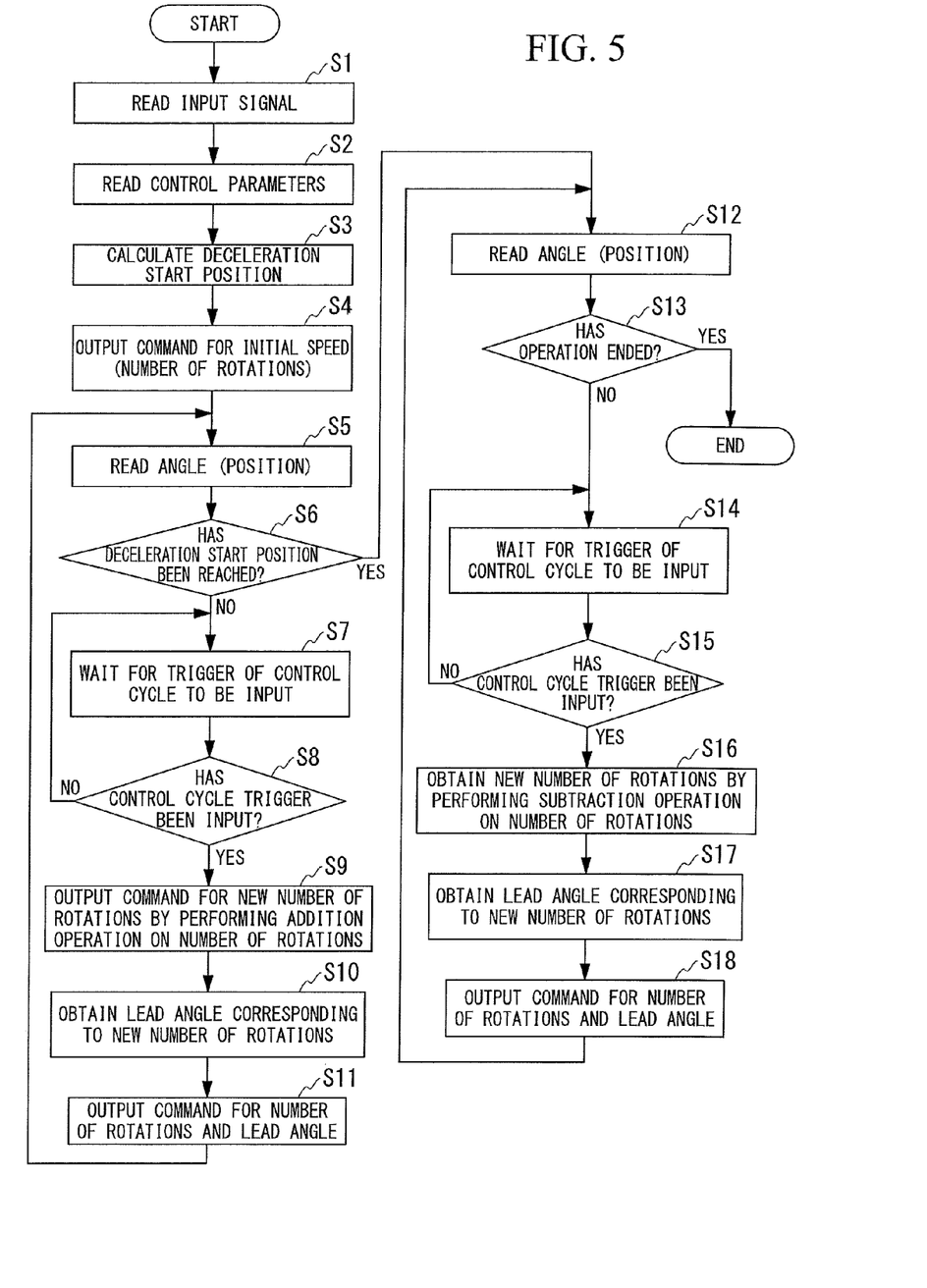
FIG. 5 is a flowchart illustrating an operation of a control unit 4 illustrated in FIG. 1.

Next, an operation in which the control unit 4 illustrated in FIG. 1 controls the rotation of the motor 2 will be described with reference to FIG. 5. First, the signal input unit 41 reads an input signal, and outputs the read input signal to the driving control unit 42 (step S1). The driving control unit 42 specifies a pattern of the input signal output from the signal input unit 41, and reads control parameters associated with the input signal pattern consistent with the specified input signal pattern from the parameter storage unit 43 (step S2). Here, a maximum rotation speed of "65," an operation start position of "0," and an operation end position of "150" will be described as the control parameters having been read.

Next, the driving control unit 42 calculates a deceleration start position from the operation start position of "0" and the operation end position of "150" (step S3). The deceleration start position, for example, is set as a middle point ((0+150)/2=75) between the operation start position and the operation end position. Then, the driving control unit 42 outputs a command for setting a predetermined initial value as the target rotation speed to the motor-driving unit 3 (step S4). Thereby, the motor 2 starts rotation.

Next, the driving control unit 42 reads an angle value output by the angle sensor 21 (step S5). The angle value output by the angle sensor 21 corresponds to a value representing a position of the wiper arm 1.

Then, the driving control unit 42 determines whether the read angle value has reached the deceleration start position (step S6). If the determination result indicates that the deceleration start position has not been reached, the driving control unit 42 waits for a trigger of the control cycle to be input while determining whether the trigger of the control cycle has been input (steps S7 and S8).

Then, at a point in time at which the trigger of the control cycle has been input, the driving control unit 42 obtains a new target rotation speed (the number of rotations) by adding a predetermined addition amount to the target rotation speed (the number of rotations) of the current time point (step S9). Then, the driving control unit 42 obtains a lead angle corresponding to the newly obtained number of rotations by referring to the lead angle map stored in the lead angle map storage unit 44 (step S10). Subsequently, the driving control unit 42 outputs a command for setting the obtained target rotation speed value and lead angle as a new target rotation speed and lead angle to the motor-driving unit 3 (step S11). The driving control unit 42 iterates processing operations of steps S5 to S11 until the deceleration start position is reached. Thereby, the motor 2 reaches the deceleration start position while the rotation speed increases from the operation start position, as illustrated in FIG. 3. At this time, because an optimum lead angle corresponding to the number of rotations is set, the motor 2 can efficiently rotate.

Next, at a point in time at which the deceleration start position has been reached, the driving control unit 42 reads the angle value output by the angle sensor 21 (step S12). Then, the driving control unit 42 determines whether the read angle value has reached the operation end position (step S13). If the determination result indicates that the operation end position has not been reached, the driving control unit 42 waits for a trigger of the control cycle to be input while determining whether the trigger of the control cycle has been input (steps S14 and S15).

Then, at a point in time at which the trigger of the control cycle has been input, a new target rotation speed (the number of rotations) is obtained by subtracting a predetermined subtraction amount from the target rotation speed (the number of rotations) of the current time point (step S16). Then, the driving control unit 42 obtains a lead angle corresponding to the newly obtained number of rotations by referring to the lead angle map stored in the lead angle map storage unit 44 (step S17). Subsequently, the driving control unit 42 outputs a command for setting the obtained target rotation speed value and lead angle as a new target rotation speed and lead angle to the motor-driving unit 3 (step S18). Until the operation end position is reached, the driving control unit 42 iterates processing operations of steps S12 to S18. At a point in time at which the operation end position has been reached, the rotation of the motor 2 is stopped. Thereby, the motor 2 reaches the operation end position while the rotation speed decreases, as illustrated in FIG. 3. At this time, because an optimum lead angle corresponding to the number of rotations is set, the motor 2 can efficiently rotate.

Also, although the parameter storage unit 43 in which five control parameters are associated and stored for each input signal pattern is provided in the control unit 4, the five control parameters are selected according to an input signal, and the rotation of the motor 2 is controlled based on the selected control parameters in the above description, the five control parameters may be input from the outside (a computer which generally controls the operation of the vehicle, or the like) of the control unit 4 and the driving control unit 42 may be configured to control the rotation of the motor 2 based on the input five control parameters. This is possible because the target rotation speed is obtained by an arithmetic operation inside the driving control unit 42. In addition, although the new target rotation speed is obtained by adding or subtracting a predetermined amount in the above description, a value of the target rotation speed determined for each angle in advance may be used based on an output in the angle sensor 21.

In addition, although the lead angle map illustrated in FIG. 4 is shown as an example in which the number of rotations of the motor and the lead angle to be set are associated for each of the forward rotation and the reverse rotation, it is possible to constantly rotate a motor in a state in which characteristics of the motor are good and suppress power consumption and heat generation if a lead angle map in which the number of rotations of the motor of the forward rotation and the positive lead angle are associated is used in the case of rotation in only one direction.

As described above, it is possible to constantly rotate a motor in a state in which characteristics of the motor are good and suppress power consumption and heat generation because a lead angle map in which a motor rotation speed (the number of rotations) and a lead angle are associated is stored for each of forward and reverse rotations within the control unit 4 and the lead angle corresponding to a newly obtained target rotation speed is also varied according to variation in a target rotation speed.

In addition, the wiper control process may be implemented by recording a program for implementing the function of the control unit 4 in FIG. 1 on a computer-readable recording medium and causing a computer system to read and execute the program recorded on the recording medium. The term "computer system" used herein may include an operating system (OS) and/or hardware such as peripheral devices. In addition, the term "computer-readable recording medium" refers to a storage device including a flexible disk, a magneto-optical disc, a read only memory (ROM), a portable medium such as a compact disc-ROM (CD-ROM), and a hard disk embedded in the computer system. Further, the term "computer-readable recording medium" may include a computer-readable recording medium for holding programs for a predetermined time such as a volatile memory (random access memory (RAM)) inside a computer system including a server and a client when a program is transmitted via a network such as the Internet or a communication line such as a telephone line.

In addition, the above-described program may be transmitted from a computer system storing the program in a storage device or the like to other computer systems via a transmission medium or transmission waves of the transmission medium. Here, the term "transmission medium" for transmitting the program refers to a medium having a function of transmitting information like a network (communication network) such as the Internet or a communication line (communication wire) such as a telephone line. The above-described program may be used to implement some of the above-described functions. Further, the program may be a so-called differential file (differential program) capable of implementing the above-described functions in combination with a program already recorded on the computer system.

INDUSTRIAL APPLICABILITY

The present invention can be applied to a controlling operation of an object to be controlled via a link mechanism connected to a rotary shaft of a motor and, for example, can also be applied to control an operation of an electric tailgate, a slide door, a power window, etc. provided in a vehicle.

REFERENCE SIGNS LIST

1 Wiper arm
2 Motor
21 Angle sensor
3 Motor-driving unit
4 Control unit
41 Signal input unit
42 Driving control unit
43 Parameter storage unit
44 Lead angle map storage unit

The invention claimed is:

1. A motor control device which controls a motor by performing switching between forward rotation and reverse rotation so as to cause an object to be controlled to reciprocate, the motor control device comprising:
   a signal input unit configured to input a signal from an outside;
   a parameter storage unit in which parameters necessary for controlling the motor including an input signal pattern input by the signal input unit, information about operation start and end positions of the object to be controlled, and information about a maximum rotation speed of the motor are associated and stored in advance;
   a position detection unit configured to detect a position of the object to be controlled;
   a lead angle map storage unit configured to store a lead angle map in which a number of rotations of the motor and a lead angle to be set are associated for each of the forward rotation and the reverse rotation; and
   a driving control unit configured to:
      read the parameters necessary for controlling the motor associated with the input signal pattern input by the signal input unit from the parameter storage unit,
      calculate a deceleration start position from the information about the operation start and end positions,
      obtain a new number of rotations of the motor by adding a predetermined addition amount to the number of rotations of the motor of a current time point and obtain a lead angle corresponding to the new number of rotations of the motor by the lead angle map storage unit when the object to be controlled is operated from the operation start position to the operation end position to drive the motor while accelerating the motor so that the motor rotates at the new number of rotations of the motor until the position detection unit detects that the object to be controlled has reached the deceleration start position, and
      obtain a new number of rotations of the motor by subtracting a predetermined subtraction amount from the number of rotations of the motor of a current time point and obtain a lead angle corresponding to the new number of rotations of the motor by the lead angle map storage unit at a point in time at which it is detected that the object to be controlled has reached the deceleration start position to drive the motor while decelerating the motor so that the motor rotates at the new number of rotations of the motor until the position detection unit detects that the object to be controlled has reached the operation end position.

2. The motor control device according to claim 1, wherein the object to be controlled is a wiper device provided in a vehicle.

* * * * *